US006480701B1

(12) United States Patent
Yonekura et al.

(10) Patent No.: US 6,480,701 B1
(45) Date of Patent: Nov. 12, 2002

(54) COMPOSITE FILTER, DUPLEXER AND COMMUNICATION APPARATUS

(75) Inventors: Hiroshi Yonekura, Yokaichi (JP); Hirofumi Miyamoto, Kanazawa (JP); Hisashi Mouri, Yokaichi (JP); Shinichi Sougoya, Ishikawa-ken (JP); Soichi Nakamura, Ishikawa-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/346,103

(22) Filed: Jul. 1, 1999

(30) Foreign Application Priority Data

Jul. 1, 1998 (JP) .......................................... 10-186343

(51) Int. Cl.[7] ............................ H04B 1/44; H04B 1/56; H01P 1/12

(52) U.S. Cl. .......................... 455/78; 370/276; 333/100

(58) Field of Search .............................. 455/78, 82, 83; 333/100, 167; 370/276

(56) References Cited

U.S. PATENT DOCUMENTS 5,293,141 A * 3/1994 Kobayashi et al. ........... 455/82
5,534,829 A * 7/1996 Kobayashi et al. ........... 455/83
5,903,820 A * 5/1999 Hagstrom .................... 455/82
6,023,608 A * 2/2000 Yrjola et al. ................. 455/78

FOREIGN PATENT DOCUMENTS

| | | |
|---|---|---|
| EP | 508812 A | 10/1992 |
| JP | 235801 A | 10/1987 |
| JP | 2094901 | 4/1990 |
| JP | 05-121904 | 5/1993 |
| JP | 11-274811 | 10/1999 |

OTHER PUBLICATIONS

Japanese Examination Report dated Apr. 2, 2002, along with an English translation.

* cited by examiner

*Primary Examiner*—Nay Maung
(74) *Attorney, Agent, or Firm*—Dickstein, Shapiro, Morin & Oshinsky, LLP.

(57) ABSTRACT

The invention provides a composite filter comprising: a single unitary dielectric block having an outer conductor on the external surfaces thereof; a plurality of inner conductors disposed in the dielectric block; a plurality of filters with different frequencies respectively comprising resonators made of at least one of said inner conductor; a first portion of said dielectric block constituting at least one of said filter comprising a first dielectric material; a second portion of said dielectric block constituting the other one of said filter comprising a second dielectric material; and the dielectric constant of said first dielectric material and said second dielectric material being different from each other.

11 Claims, 2 Drawing Sheets

COMPOSITE FILTER, DUPLEXER AND COMMUNICATION APPARATUS

BACKGROUND OF THE INVENTION

1. Field of the invention

The present invention relates to a composite filter and a duplexer, in which a plurality of filters is formed in a single dielectric block, and a communication apparatus using the same, used in the microwave band of a mobile phone or the like.

2. Description of the Related Art

Conventionally, a duplexer, in which resonators forming a transmitting-side filter and resonators forming a receiving-side filter are integrally molded in a single dielectric block formed of dielectric materials with an equivalent dielectric constant, is known. Such a duplexer is formed by disposing a plurality of resonator holes having inner conductors on the inner peripheral surfaces thereof between opposing end surfaces of the dielectric block having an outer conductor on an external surface thereof, in which each of the inner conductors is formed for serving as a one-end open resonator which is separated from the outer conductor on one end, whereas it is short-circuited with the outer conductor on the other end.

Since the transmitting-side filter and the receiving-side filter have different frequencies in such a conventional duplexer, the lengths of resonators forming the respective filters are naturally different, in which there is a difference in the length of the resonator length direction between the portion forming the transmitting-side filter and the portion forming the receiving-side filter, whereby the unit has a configuration with a step portion on the outline of the dielectric block. For example, when a central frequency of the transmitting-side filter is 836.5 MHz, a central frequency of the receiving-side filter is 881.5 MHz, if a dielectric material whose relative dielectric constant $\in r$ is 92 is used, the resonator length of the transmitting-side filter is 9.34 mm, and the resonator length of the receiving-side filter is 8.86 mm, resulting in generating a step, which is 0.48 mm, on the outline of the dielectric block.

Furthermore, conventionally, there is provided a duplexer, in which a portion of an inner conductor is eliminated to form an open end of a resonator inside a dielectric block, and adjustment of a location for forming the open end allows a transmitting-side filter and a receiving-side filter to be formed in a single dielectric block formed of materials having the equivalent dielectric constant, with no steps on its outline. (Japanese Unexamined Patent Publication No. 8-330806).

However, regarding the former type of the above described prior art duplexer, in which the end of the dielectric block is an open end, when the dielectric block is molded, various kinds of molding metal dies with high precision, having step portions according to the frequency difference between the two filters, are needed, so that die cost and molding cost increase. Additionally, due to its complicated configuration having a step on the outline, looseness and deviation are likely to occur in processing, assembly, measurement, mounting, or the like after molding, so that work such as location determination is complicated so as to increase production cost.

Meanwhile, as the later type, in the prior art duplexer, in which the open end of a resonator is formed inside the dielectric block, when the difference between the frequency of the transmitting-side filter and that of the receiving-side filter is large, the open end (that is, a portion where no inner conductor is formed) of the resonator forming the filter of a lower frequency is needed to be formed in a location which is very deeply recessed from the open-side end surface of the dielectric block, leading to difficulty in forming the non-inner-conductor portion or forming with high precision in a specified location.

SUMMARY OF THE INVENTION

To overcome the above described problems, preferred embodiments of the present invention provide a composite filter, a duplexer, and a communication apparatus, which are low-cost, small, and have satisfactory characteristics.

One preferred embodiment of the present invention provides a composite filter comprising: a single unitary dielectric block having an outer conductor on the external surfaces thereof; a plurality of inner conductors disposed in the dielectric block; a plurality of filters with different frequencies respectively comprising resonators made of at least one of said inner conductor; a first portion of said dielectric block constituting at least one of said filter comprising a first dielectric material; a second portion of said dielectric block constituting the other one of said filter comprising a second dielectric material; and the dielectric constant of said first dielectric material and said second dielectric material being different from each other.

The above described composite filter may be a duplexer in which at least one of said filter comprising said first portion of said dielectric block and said first dielectric material is a transmitting-side filter; and at least one of said filter comprising said second portion of said dielectric block and said second dielectric material is a receiving-side filter.

Another preferred embodiment of the present invention provides a communication apparatus comprising: a transmission circuit; a reception circuit; an antenna; the above described composite filter or duplexer: said at least one of said filter comprising said first portion of said dielectric block and said first dielectric material having a first input and a first output, said first input being connected to said transmission circuit, and said first output being connected to said antenna; and the other one of said filter comprising said second portion of said dielectric block and said second dielectric material having a second input and a second output, said second input being connected to said antenna, and said second output being connected to said reception circuit.

In the composite filter or the duplexer having the above described structure, a plurality of filters with different frequencies are formed in the single unitary dielectric block, in which the portion forming at least one of the filters is formed of a dielectric material having a dielectric constant different from that of the portion forming the other filter. In this structure, appropriate selection of a dielectric constant of the portion forming each filter corresponding to the frequency of each filter allows the physical resonator length of each resonator having a different frequency to be made into the equivalent length, even when the open end of each resonator is formed in the same position. More specifically, the present invention is achieved by using dielectric materials, in which a dielectric constant of the portion forming a lower-frequency filter is larger than that of the portion forming a high-frequency filter. That is, the single dielectric block including a plurality of filters with different frequencies can be made into rectangular parallelepiped configuration having no steps.

In addition, when the inner conductor is eliminated to form an open end, the open end of each resonator can be formed substantially in the same position near the open-side end surface, so that formation of the non-inner-conductor portion can be easily conducted with high precision.

Furthermore, combining the method of using dielectric materials having different dielectric constants in the present invention with other designing methods such as changing the position of the open end can enhance freedom in design, so that various kinds of characteristics can be easily obtained by using a single dielectric block without any step formed.

In the composite filter and the duplexer according to the present invention, a plurality of filters are formed in the single unitary dielectric block integrally molded and burned, in which the number of components are less than that in a unit with each filter formed by an individual dielectric block so as to permit easy handling, or to make it unnecessary to bond a plurality of the filters together by soldering or the like, leading to cost reduction.

Furthermore, since the communication apparatus according to the present invention includes the composite filter or the duplexer having the above-described characteristics, low cost, miniaturization, and satisfactory characteristics can be achieved.

Other features and advantages of the present invention will become apparent from the following description of the invention which refers to the accompanying drawings.

DESCRIPTION OF THE PREFERRED EMBODIMENTS

Figure 1:
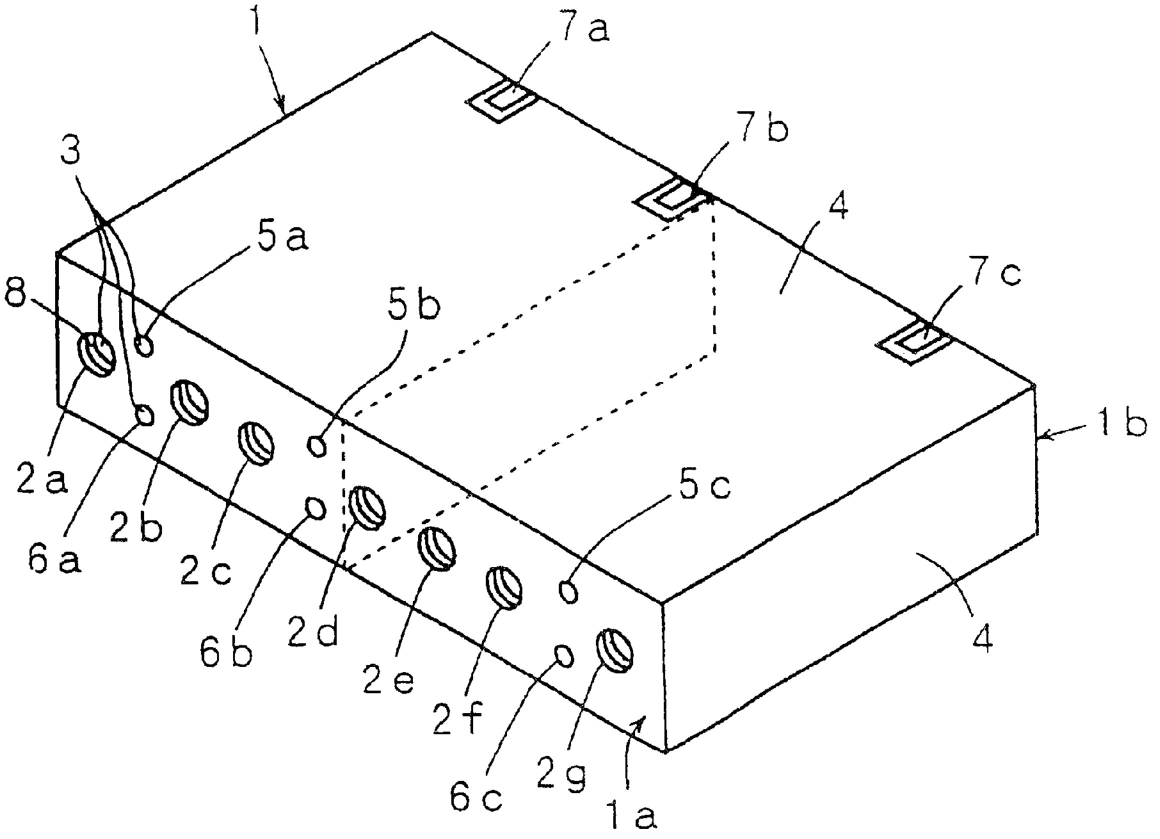
FIG. 1 is a perspective view of a duplexer according to a first preferred embodiment of the present invention.
Figure 2:
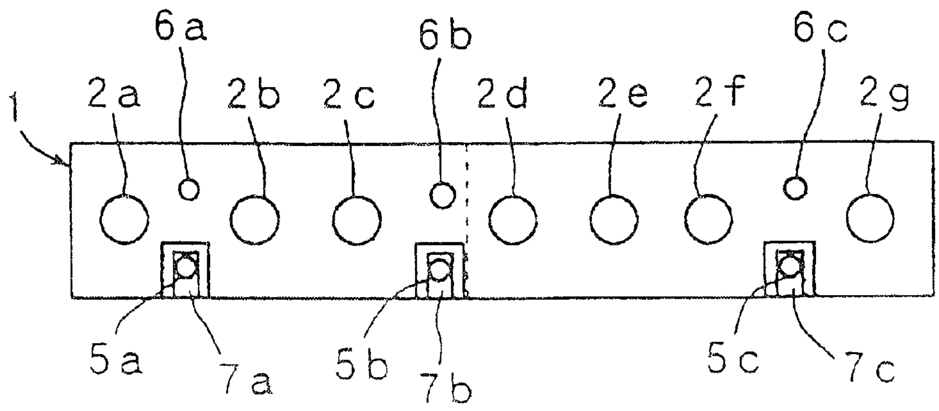
FIG. 2 is a plan view of a short-circuited end surface of the duplexer according to the first preferred embodiment of the present invention.

Referring to FIG. 1 and FIG. 2, the duplexer employed in the first preferred embodiment includes a dielectric block 1 of rectangular parallelepiped configuration formed by integral molding. Seven resonator holes 2*a* through 2*g* are formed running through between a pair of opposing end surfaces 1*a* and 1*b* of the dielectric block 1, and external coupling holes 5*a*, 5*b*, and 5*c*, and ground holes 6*a*, 6*b*, and 6*c* are formed between the resonator holes 2*a* and 2*b*, between the resonator holes 2*c* and 2*d*, and between the resonator holes 2*f* and 2*g*. An outer conductor 4 is formed on the substantially entire external surfaces of the dielectric block 1, and an inner conductor 3 is formed on each of the inner peripheral surfaces of the resonator holes 2*a* through 2*g*, the external coupling holes 5*a*, 5*b*, and 5*c*, and the ground holes 6*a*, 6*b*, and 6*c*.

Each inner conductor 3 inside the resonator holes 2*a* through 2*g* is separated from the outer conductor 4 by a non-inner-conductor portion 8 on the side of the open-side end surface 1*a*, whereas it is electrically connected to the outer conductor 4 on the short-circuited side end surface 1*b*. In other words, the open end of a resonator corresponding to each inner conductor 3 of the resonator holes 2*a* through 2*g* is formed by each non-inner-conductor portion 8 in the substantially equivalent position deeply recessed from the open-side end surface 1*a*. The non-inner-conductor portion 8 is formed by cutting away and eliminating the inner conductor 3 by a router or the like. Input/output electrodes 7*a*, 7*b*, and 7*c* extend over the short-circuited side end surface 1*b* and a side surface (a bottom surface) to be electrically connected to the inner conductors 3 of the external resonator holes 5*a* through 5*c*, whereas they are separated from the outer conductor 4.

In this arrangement, coupling of the two resonators corresponding to the inner conductors 3 of the resonator holes 2*b* and 2*c* permits a transmission filter to be formed, and the transmission filter and a trap (a band elimination filter with a resonator) formed by a resonator corresponding to the inner conductor 3 of the resonator hole 2*a* comprise a transmitting-side filter. Additionally, coupling of the three resonators corresponding to the inner conductors 3 of the resonator holes 2*d*, 2*e* and 2*f* permits a reception filter to be formed, and the reception filter and a trap formed by a resonator corresponding to the inner conductor 3 of the resonator hole 2*g* comprise a receiving-side filter. The central frequency of the transmission filter is lower than the central frequency of the reception filter.

Each electromagnetic-field coupling between the external coupling hole 5*a* and the adjacent resonator holes 2*a* and 2*b*, between the external coupling hole 5*b* and the adjacent resonator holes 2*c* and 2*d*, and between external coupling hole 5*c* and the adjacent resonator holes 2*f* and 2*g*, occurs and external couplings are obtained from the electromagnetic couplings. The duplexer is surface-mounted in such a manner that the side surfaces (the upper surfaces in FIG. 1), on which the input/output electrodes 7*a*, 7*b*, and 7*c* are formed, are surfaces to be mounted. The input/output electrode 7*a* is a transmission terminal of the transmitting-side filter, the input/output electrode 7*c* is a reception terminal of the receiving-side filter, and the input/output electrode 7*b* is an antenna terminal for common use of an input/output of the transmitting-side filter and the receiving-side filter.

In a dielectric block 1 of this embodiment, the left region (first portion), in which the resonator holes 2*a* through 2*c* forming the transmitting-side filter are disposed, is formed of a dielectric material with a large dielectric constant, whereas the right region (a second portion), in which the resonator holes 2*d* through 2*g* forming the receiving-side filter are disposed, is formed of a dielectric material with a small dielectric constant, and the length of a resonator corresponding to the inner conductor 3 of the respective resonator holes is equivalent. That is, the surface indicated by broken lines in FIG. 1 and FIG. 2 is a boundary surface so as to form the left region and the right region by using a dielectric material with a different dielectric constant.

More specifically, the arrangement is such that the central frequency of the transmission filter is 836.5 MHz, the central frequency of the reception filter is 881.5 MHz; in which the left region forming the transmitting-side filter is formed of a dielectric material with a relative dielectric constant $\in r$ of 102.3, while the right region forming the receiving-side filter is formed of a dielectric material with a relative dielectric constant $\in r$ of 92; and the resonator length of the transmitting-side filter and the resonator length of the receiving-side filter are both about 8.86 mm.

The boundary surface is not limited to the position indicated by the broken lines shown in the figures. It is set near the external coupling hole 5*b*. In addition, the configuration and number of the external coupling hole and the ground hole are not limited to the case shown in the figures, and they can be appropriately determined, as needed depending on required characteristics.

To obtain the above described single unitary dielectric body comprising the first portion and the second portion, at least two green sheets having different dielectric constants to each other are laminated, and, after being subjected to heat press, cut into a molded body. After burning organic components of the molded body obtained in the air atmosphere (at 500 degrees Centigrade for example), fired in an oxygen atmosphere (at 1350 degrees Centigrade for example) for a few hours (two hours for example) to obtain a sintered body i.e., the single unitary dielectric block.

As describe above, in the duplexer having the two filter sections with different frequencies, forming the dielectric block with dielectric materials having different dielectric constants permits the configuration of the dielectric block to be of rectangular parallelepiped having no steps, even though the open end of each resonator is formed substantially in the same position. At the same time, miniaturization can be achieved.

In this embodiment, the open end is disposed in a position deeply recessed from the end surface of the dielectric block. However, this is not the only case, and a duplexer having an arrangement in which the opening surface of a resonator hole is used as the open end may be applicable. When the end surface is used as the open end like this case, the present invention can be a more effective method.

Furthermore, as in the embodiment, even in the case of forming the open end of a resonator inside the dielectric block, the open end of each resonator can be formed in the substantially equivalent position near the open-side end surface, so that formation of a non-inner-conductor portion can be easily conducted with high precision.

Additionally, combining the method of using dielectric materials having different dielectric constants employed in the present invention with other methods such as the method of changing the position of the open end enhances freedom in design, so that various characteristics can be easily achieved by using the single dielectric block having no steps.

Accordingly, the dielectric block can be molded without using a metal die with a complicated configuration; processing, assembly, measurement, and mounting after molding can be facilitated; and reduction in molding cost and manufacturing cost can be achieved so as to obtain satisfactory characteristics with less variations.

Although the duplexer of the above embodiment has such an arrangement that the two kinds of dielectric materials with different dielectric constants are integrally molded to form the dielectric block, the regions for forming the traps on both sides may also be formed of dielectric materials having dielectric constants.

The above embodiment has adopted the duplexer as an example for explanation. However, the present invention can also be applied to a composite filter, in which a plurality of filters for transmitting two or more kinds of signals with different transmission-band frequencies are formed in a single dielectric block.

Furthermore, the composite filter and the duplexer according to the present invention are not restricted to the above embodiment, and various modifications are applicable within the range of the scope and the sprit of the invention. For example, the resonator hole may be the so-called step hole including a wide inner-diameter portion and a small inner-diameter portion, and regarding coupling between the respective resonators or coupling between the resonators and the external coupling holes, other coupling methods such as a comb-line coupling, or an interdigital coupling may be possible. An arrangement in which the external coupling is obtained by a capacity coupling between the input/output electrode and the inner conductor may be possible.

Figure 3:
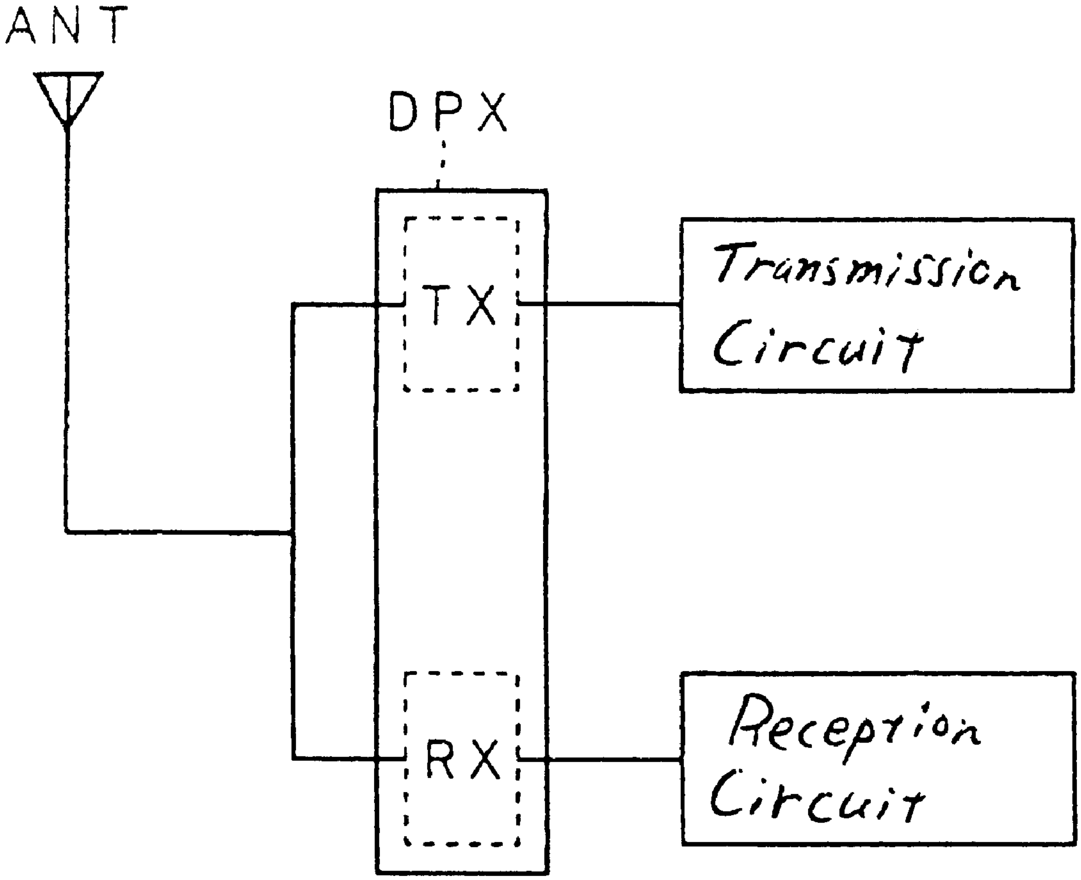
FIG. 3 is a block diagram of a communication apparatus according to a second preferred embodiment of the present invention.

Next, FIG. 3 shows a structure of a second preferred embodiment of the communication apparatus according to the present invention. In FIG. 3, ANT is an antenna, DPX is a duplexer, TX is a transmitting-side filter, and RX is a receiving-side filter. The output end of the transmitting-side filter TX is connected to the antenna ANT, and the input end of the same is connected to a transmission circuit, while the input end of the receiving-side filter RX is connected to the antenna ANT, and the output end of the same is connected to a reception circuit, whereby a communication apparatus is formed.

In this arrangement, the duplexer shown in FIG. 1 of the first embodiment can be used as the duplexer DPX. Use of the duplexer in accordance with the present invention allows a communication apparatus, which is low cost, small, and satisfactory in the characteristics, to be obtained.

While the invention has been particularly shown and described with reference to preferred embodiments thereof, it will be understood by those skilled in the art that the forgoing and other changes in form and details may be made therein without departing from the spirit of the invention.

What is claimed is:

1. A communication apparatus comprising:

a transmission circuit;

a reception circuit;

an antenna connector;

a duplexer comprising:

a single unitary dielectric block having an outer conductor on external surfaces thereof;

a plurality of inner conductors disposed in the dielectric block;

a plurality of filters with different frequencies, each said filter comprising a respective plurality of resonators, each said resonator comprising a corresponding one of said inner conductors;

a first one of said filters being disposed in a first portion of said dielectric block and comprising substantially only a first dielectric material;

a second one of said filters being disposed in a second portion of said dielectric block and comprising substantially only a second dielectric material; and the dielectric constant of said first dielectric material and the dielectric constant of said second dielectric material being different from each other;

said first filter disposed in said first portion of said dielectric block is a transmitting-side filter having a first input and a first output, said first input being connected to said transmission circuit, and said first output being connected to said antenna connector; and said second filter disposed in said second portion of said dielectric block is a receiving-side filter having a second input and a second output, said second input being connected to said antenna connector, and said second output being connected to said reception circuit.

2. The communication device according to claim 1, said duplexer further comprising a coupling hole formed in said dielectric block between said first and second filters for coupling said first output of said first filter and said second input of said second filter in common to said antenna connector.

3. The communication device according to claim 2, said duplexer further comprising a ground hole formed in said dielectric block between said first and second filters.

4. The communication device according to claim 1, said duplexer further comprising a ground hole formed in said dielectric block between said first and second filters.

5. The communication device according to claim 1, said duplexer further comprising first and second external coupling holes formed in said dielectric block for coupling to said first input of said first filter and said second output of said second filter, respectively.

6. The communication device according to claim 5, said duplexer further comprising first and second ground holes formed in said dielectric block near said first and second external coupling holes, respectively.

7. A duplexer comprising:

a single unitary dielectric block having an outer conductor on external surfaces thereof;

a plurality of inner conductors disposed in the dielectric block;

a plurality of filters with different frequencies, each said filter comprising a respective plurality of resonators, each said resonator comprising a corresponding one of said inner conductors;

a first one of said filters being disposed in a first portion of said dielectric block and comprising substantially only a first dielectric material;

a second one of said filters being disposed in a second portion of said dielectric block and comprising substantially only a second dielectric material;

a coupling hole formed in said dielectric block between said first and second filters for coupling said first and second filters in common to an antenna connector; and the dielectric constant of said first dielectric material and the dielectric constant of said second dielectric material being different from each other;

said first filter disposed in said first portion of said dielectric block is a transmitting-side filter;

said second filter disposed in said second portion of said dielectric block is a receiving-side filter.

8. The duplexer according to claim 7, further comprising a ground hole formed in said dielectric block between said first and second filters.

9. A duplexer comprising:

a single unitary dielectric block having an outer conductor on external surfaces thereof;

a plurality of inner conductors disposed in the dielectric block;

a plurality of filters with different frequencies, each said filter comprising a respective plurality of resonators, each said resonator comprising a corresponding one of said inner conductors;

a first one of said filters being disposed in a first portion of said dielectric block and comprising substantially only a first dielectric material;

a second one of said filters being disposed in a second portion of said dielectric block and comprising substantially only a second dielectric material;

a ground hole formed in said dielectric block between said first and second filters; and the dielectric constant of said first dielectric material and the dielectric constant of said second dielectric material being different from each other;

said first filter disposed in said first portion of said dielectric block is a transmitting-side filter;

said second filter disposed in said second portion of said dielectric block is a receiving-side filter.

10. A duplexer comprising:

a single unitary dielectric block having an outer conductor on external surfaces thereof;

a plurality of inner conductors disposed in the dielectric block;

a plurality of filters with different frequencies, each said filter comprising a respective plurality of resonators, each said resonator comprising a corresponding one of said inner conductors;

a first one of said filters being disposed in a first portion of said dielectric block and comprising substantially only a first dielectric material;

a second one of said filters being disposed in a second portion of said dielectric block and comprising substantially only a second dielectric material;

first and second external coupling holes formed in said dielectric block for coupling to said first and second filters, respectively; and the dielectric constant of said first dielectric material and the dielectric constant of said second dielectric material being different from each other;

said first filter disposed in said first portion of said dielectric block is a transmitting-side filter;

said second filter disposed in said second portion of said dielectric block is a receiving-side filter.

11. The duplexer according to claim 10, further comprising first and second ground holes formed in said dielectric block near said first and second external coupling holes, respectively.

* * * * *